United States Patent
Ersoy et al.

(10) Patent No.: US 6,299,149 B1
(45) Date of Patent: Oct. 9, 2001

(54) SPRINGRATE CONTROLLED MOTOR BEARING

(75) Inventors: Metin Ersoy, Walluf; Hubert Siemer, Dinklage, both of (DE)

(73) Assignee: ZF Lemforder Metallwaren AG (DE)

( * ) Notice: Subject to any disclaimer, the term of this patent is extended or adjusted under 35 U.S.C. 154(b) by 0 days.

(21) Appl. No.: 09/719,078

(22) PCT Filed: Mar. 27, 2000

(86) PCT No.: PCT/DE00/00951

§ 371 Date: Dec. 6, 2000

§ 102(e) Date: Dec. 6, 2000

(87) PCT Pub. No.: WO00/61964

PCT Pub. Date: Oct. 19, 2000

(30) Foreign Application Priority Data

Apr. 8, 1999 (DE) .................................. 199 15 70

(51) Int. Cl.⁷ ................. F16F 5/00; F16M 5/00

(52) U.S. Cl. ............. 267/140.13; 248/550; 267/136

(58) Field of Search .................. 267/136, 140.11, 267/140.13, 219; 248/550, 636, 638

(56) References Cited

U.S. PATENT DOCUMENTS

| | | | |
|---|---|---|---|
| 4,699,257 | * 10/1987 | Lloyd | 188/380 |
| 5,245,807 | * 9/1993 | Ishimaru et al. | 248/550 |
| 5,275,357 | * 1/1994 | Seelen et al. | 244/54 |
| 5,620,168 | * 4/1997 | Ohtake et al. | 267/140.13 |

* cited by examiner

*Primary Examiner*—Christopher P. Schwartz
(74) *Attorney, Agent, or Firm*—McGlew and Tuttle, P.C.

(57) ABSTRACT

A spring rate-switchable engine bearing with a supporting bearing element and a supporting element is presented, which has at least two spring elements arranged in parallel or in series between the supporting bearing element and the supporting element. One of the spring elements can be blocked by a switching device, in which the switching device has a double toggle mechanism. Extraordinarily high axial forces in the range of >10 kN can be transmitted due to this design according to the present invention in the blocked state of the spring element, and an especially compact design is also obtained due to this design at the same time. Moreover, a lightweight and small motor operator drive can be directly integrated in the engine bearing according to the present invention due to the extraordinarily high power amplification of the double toggle mechanism being used without additional supplementary components being necessary outside the bearing.

14 Claims, 4 Drawing Sheets

SPRINGRATE CONTROLLED MOTOR BEARING

FIELD OF THE INVENTION

The present invention pertains to a spring rate-switchable engine bearing with a supporting bearing and a supporting element, which has at least two spring elements arranged in parallel or in series between the supporting bearing and the supporting element, wherein one of the spring elements can be blocked by a switching device.

BACKGROUND OF THE INVENTION

Engine bearings of this type have been generally known in the state of the art and are preferably intended for mounting the internal combustion engine of a motor vehicle and to prevent disturbing vibrations from being transmitted from the engine to the body.

Disturbing vibrations of essentially two types, caused by the engine, occur during the operation of the vehicle and they therefore require different stiffnesses of the engine bearings used for the vibration damping. To embody the different damping characteristics, hydraulically damped engine bearings can be used, in which a second spring element is connected in parallel or in series to the first spring element, which is designed, e.g., as a conventional rubber bearing. If the spring action of the two spring elements connected in series is effective, the overall stiffness of the engine bearing is lower than the individual spring stiffness of the two spring elements used. If such an engine bearing is blocked by means of a corresponding switching device, this means that the flux of force flowing through the engine bearing flows only over one spring element, whose stiffness alone is effective and is substantially higher than when both spring elements are effective at the same time.

Various possible embodiments for blocking one of the spring elements have been known in the state of the art. For example, DE 41 30 362 discloses an engine bearing comprising two elastomeric spring elements, in which one spring element is blocked by means of a hydraulically pressurized pressure pad such that two housing elements, which enclose the spring element to be blocked between them, are brought into contact with one another in a non-positive manner by pumping up the pressure pad. This type of blocking of a spring element has the drawback that an external hydraulic energy source, which requires a relatively large installation space with the corresponding connection lines to the engine bearing and whose installation is also labor-intensive and expensive, is always necessary for such engine bearings.

The above-mentioned prior-art document also discloses the possibility of embodying the blocking of a spring element by a motor operator with a pressure piston which is actuated by same. Two support plates are brought into non-positive contact with one another by the motor operator with the pressure piston, so that the second spring element in the form of a rubber body is thus bridged over and is put out of operation.

Since the motor operator moves the piston for blocking the second spring element by means of a screw spindle, the axial and radial forces that can be transmitted are limited in this exemplary embodiment or the switching means occupies a rather substantial mounting space because of it being dimensioned for stronger forces, which in turn limits the use of the entire engine bearing.

Moreover, DE 34 03 002 discloses an engine bearing which is based on the cooperation of two spring elements with different spring characteristics and a switching coupling. The switching coupling, which can be actuated electromagnetically, is connected in series with the relatively harder spring element. The switching coupling is used to compress a disk packet by magnetic forces in the switched-on state in order to thus establish a rigid connection between the first spring element and the supporting element, so that the second spring element is put out of operation. The transmission of axial and radial forces is limited in this engine bearing as well because of the friction forces to be applied between the individual disks of the switching coupling, which can be compensated by a bulkier design in certain ranges, but these engine bearings are, on the whole, disadvantageous because of their size and weight.

SUMMARY AND OBJECTS OF THE INVENTION

The object of the present invention is therefore to improve an engine bearing of this type such that a desired, hard spring characteristic is obtained for operation during travel and a gentle spring characteristic is obtained for the idling of the engine. The different spring characteristics are of great significance especially in the direct injection diesel engines which have been used for some time, because the vibrations occurring during idling in these engines are substantially greater than in the diesel or gasoline engines used hitherto in automotive engineering. Moreover, the bearing shall have small dimensions and a low weight. In addition, the switching device used is required to be able to transmit strong axial forces on the order of magnitude of approx. 10 kN as well as radial forces, and the switching device shall have short switchover times for blocking and releasing the spring element to be blocked, and complicated external auxiliary units are no longer necessary.

According to the invention, a spring rate-switchable engine bearing is provided with a supporting bearing element and a supporting element. The bearing has at least two spring elements arranged in parallel or in series between the supporting bearing element and the supporting element. One of the said spring elements can be blocked by a switching device. Provisions are made in the spring rate-switchable engine bearing according to the present invention for the switching device to have a double toggle mechanism.

The double toggle mechanism is characterized in that an extraordinarily great power amplification can be generated by the mechanism due to suitable dimensioning, so that the very strong pretensioning force generated by the toggle mechanism guarantees the desired high transmission of axial forces in the range of >10 kN in the blocked state. It proved to be particularly advantageous for the design of the double toggle mechanism for a plurality of double toggle lever elements with two pressure levels each and with one adjusting lever each, which can be moved by a common actuating member, to be arranged concentrically to the central axis of the engine bearing, wherein the adjusting lever is connected by its outer end facing away from the actuating member to one end each of the two pressure levers in a pivot bearing and the outer free ends of the pressure levers, which ends are facing away from the pivot bearing, are connected to the supporting element and an intermediate plate, respectively, which are arranged between the first and second spring elements. Due to this design, the engine bearing according to the present invention can be made especially compact because the double toggle mechanisms used can be small and their cooperation nevertheless guarantees a sufficient stiffness of the bearing in the blocked state of the spring element. If, moreover, a design is used in which the blockable spring element comprises a plurality of coil springs, which are arranged concentrically to the central axis of the engine bearing directed in the longitudinal direction in parallel to the said axis and at spaced locations from one another, wherein the coil springs and the double toggle lever elements are arranged alternatingly concentrically around the central axis of the engine bearing, the engine bearing according to the present invention can thus be made even more compact.

It also proved to be advantageous to displace the actuating member responsible for moving the adjusting lever by an electric motor operator with a linear spindle in the longitudinal direction of the central axis of the engine bearing. The use of such a drive is possible only because only weak adjusting forces on the order of magnitude of 300 N are to be applied in the axial direction because of the double toggle mechanism being used. These adjusting forces can be brought about without problems with the drive being used, and a switchover time of approx. 0.5 sec can be obtained for the switching means from the blocked state into the released state. In addition, the central spindle drive actuated by the electric motor operator is an inexpensive and space-saving drive variant. As another advantage of the drive being used, there is a low energy consumption because of the weak axial adjusting forces needed. In addition, the electric drive requires only a connection with two supply lines for the energy supply and the energy control.

Moreover, it proved to be expedient for the switching device and the blockable spring element to be surrounded by a housing, the housing being supported in the blocked state of the spring element by a conical support surface, which is part of the intermediate plate between the first and second spring elements. The supporting of the housing by the conical support surface brings about an excellent transmission of the axial and radial surface in the blocked state of the engine bearing and thus reliably prevents a tendency to tilt of the first spring element, which is designed as a hydraulic bearing and is arranged above the intermediate plate. Moreover, the housing can reliably protect the toggle lever elements, the coil springs and the motor operator with the spindle, which are located inside, from external environmental effects.

In another advantageous embodiment, the free end of the pressure lever facing the supporting element can be mounted in the supporting element in an elongated hole, whose longitudinal axis extends in parallel to the longitudinal axis of the engine. Such a mounting allows both axial and radial vibrations of the upper part of the engine bearing with the hydraulic bearing located therein, so that the desired spring characteristic can be obtained without problems.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
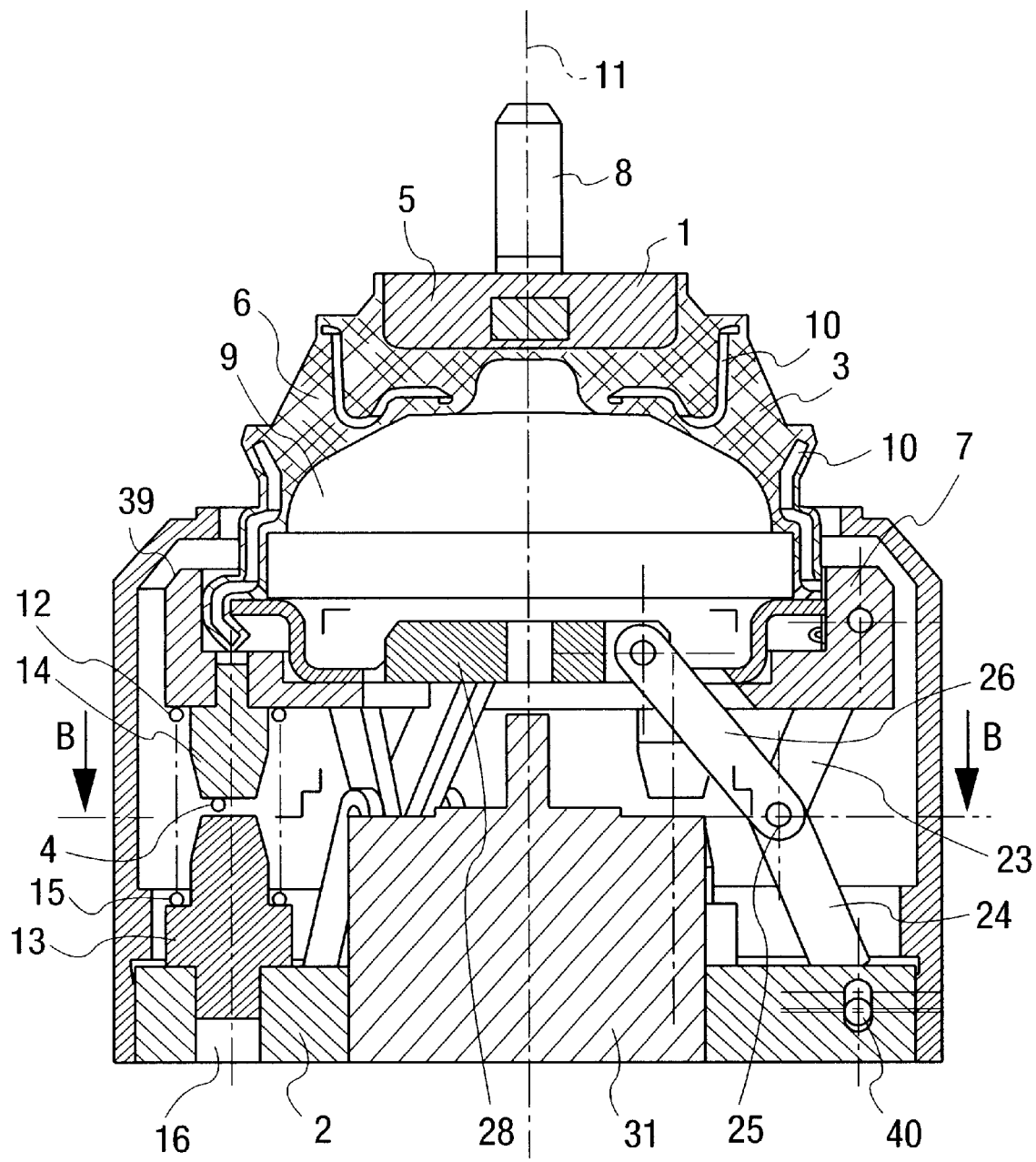
FIG. 1 is a sectional view through the engine bearing according to the present invention in the released state of the switching device.

Referring to the drawings in particular, as is shown in FIG. 1, the engine bearing according to the present invention has essentially an engine-side supporting bearing 1, a body-side supporting element 2, and spring elements 3 and 4, which are connected in series in between and which are connected to one another by means of an intermediate plate 7 in a non-positive manner.

The engine-side supporting bearing 1 has a disk-shaped supporting bearing plate 5 and a stud 8, which projects from the said supporting bearing plate 5 to the outside and is provided for connection to the engine.

The supporting bearing plate 5 is embedded in a rubber element 6, which is part of the first spring element 3. The spring element 3 comprises, moreover, a fluid-filled chamber 9 on the lower side of the rubber element 6 facing away from the supporting bearing plate 5. The lower closure of the chamber 9 is formed by the intermediate plate 7, to which the rubber element 6 surrounding the chamber is connected. Bent metal rings 10 are vulcanized in the outer edge areas of the rubber elements for stabilization. Three springs, which are designed as coil springs 12 in this exemplary embodiment and together form the second spring element 4, are located on the side of the intermediate plate 7 facing away from the chamber 9, arranged concentrically on a common radius around the central axis 11 of the engine bearing. The coil springs 12 are guided and stabilized in their longitudinal direction by two support elements 13 and 14 extending into the central hole of the coil springs.

The lower supporting element 13 has a shoulder 15, with which the lower end of the coil spring 12 comes into contact. The lower end of the supporting element 13 facing away from the shoulder 15 is accommodated in a hole 16 of the supporting element 2, wherein the supporting element 2 has connection possibilities not shown here for fastening to the body.

Figure 4:
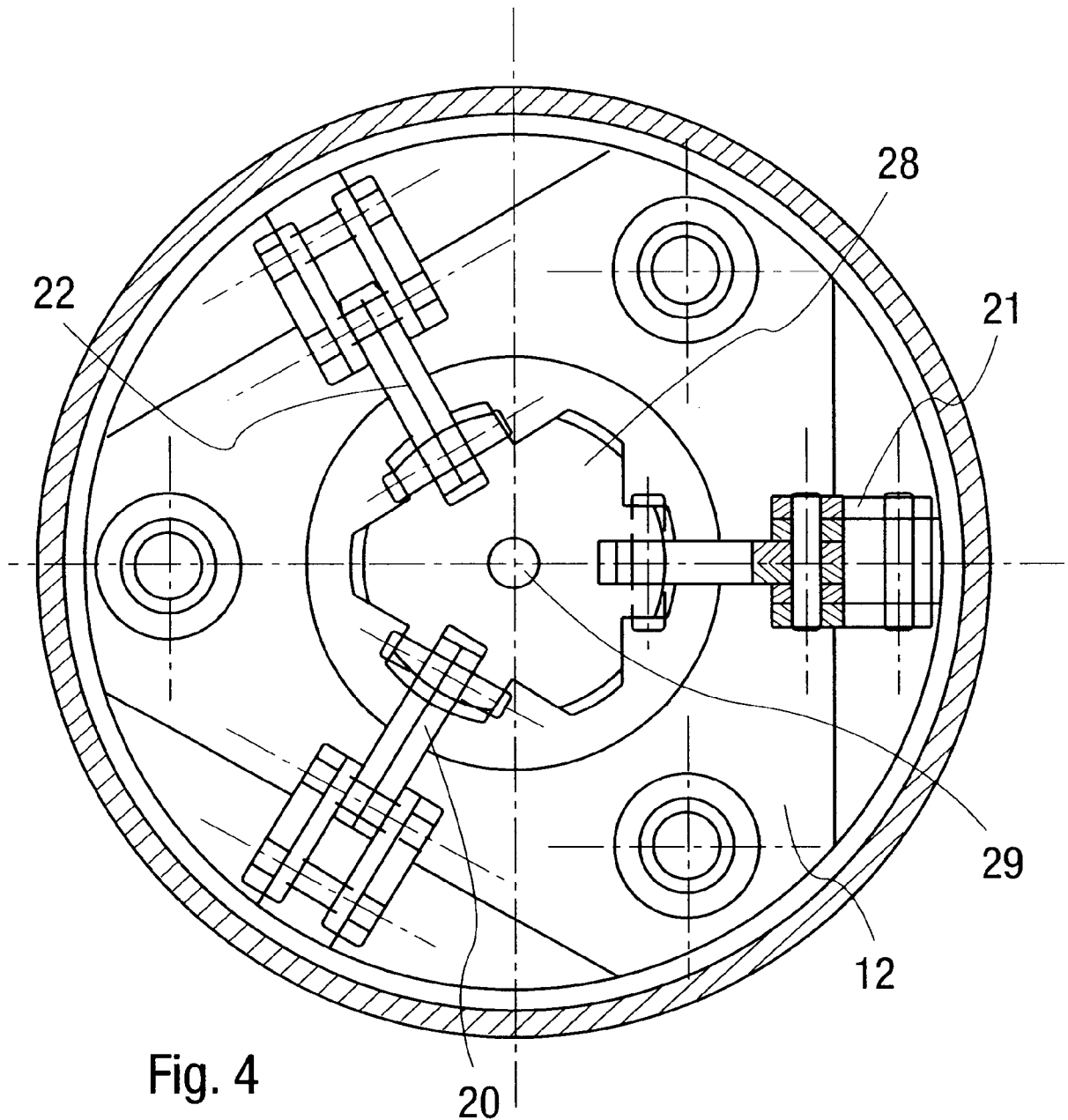
FIG. 4 is a sectional view along line B—B in FIG. 1.

As is apparent from FIG. 4, three double toggle lever elements 20, 21 and 22, which together form a double toggle mechanism which can bring about a rigid connection between the intermediate plate 7 and the supporting element 2 in the tensioned state are arranged in the segment areas of the mounting space between the intermediate plate 7 and the supporting element 2. Each double toggle lever element 20, 21, 22 comprises an upper pressure lever 23 and a lower pressure lever 24, which are fastened at their ends facing one another in a common pivot bearing 25, as well as an adjusting lever 26, which is likewise articulated to the pivot bearing. At its end facing away from the pivot bearing 25, the adjusting lever 26 is in turn connected to an actuating member 28 in an articulated manner. This actuating member comprises essentially a triangular plate, which has a central hole 29, in which a linear spindle 30 projecting in the direction of the supporting element 2 is fixed. This linear spindle 30 is in turn part of an electric motor operator 31, which is fixed on the supporting element 2 and extends into the mounting space between the supporting element 2 and the intermediate plate 7.

An axially fixed, rotatable threaded nut 32, whose rotation by the motor brings about the extension and withdrawal of the linear spindle 30 screwed into the threaded nut 32, is located within the electric motor operator. The extension and withdrawal of the linear spindle leads in turn, via the actuating member 28 and the adjusting lever 26, to a tensioning movement or a releasing movement of the double toggle lever elements 20, 21 and 22.

Figure 2:
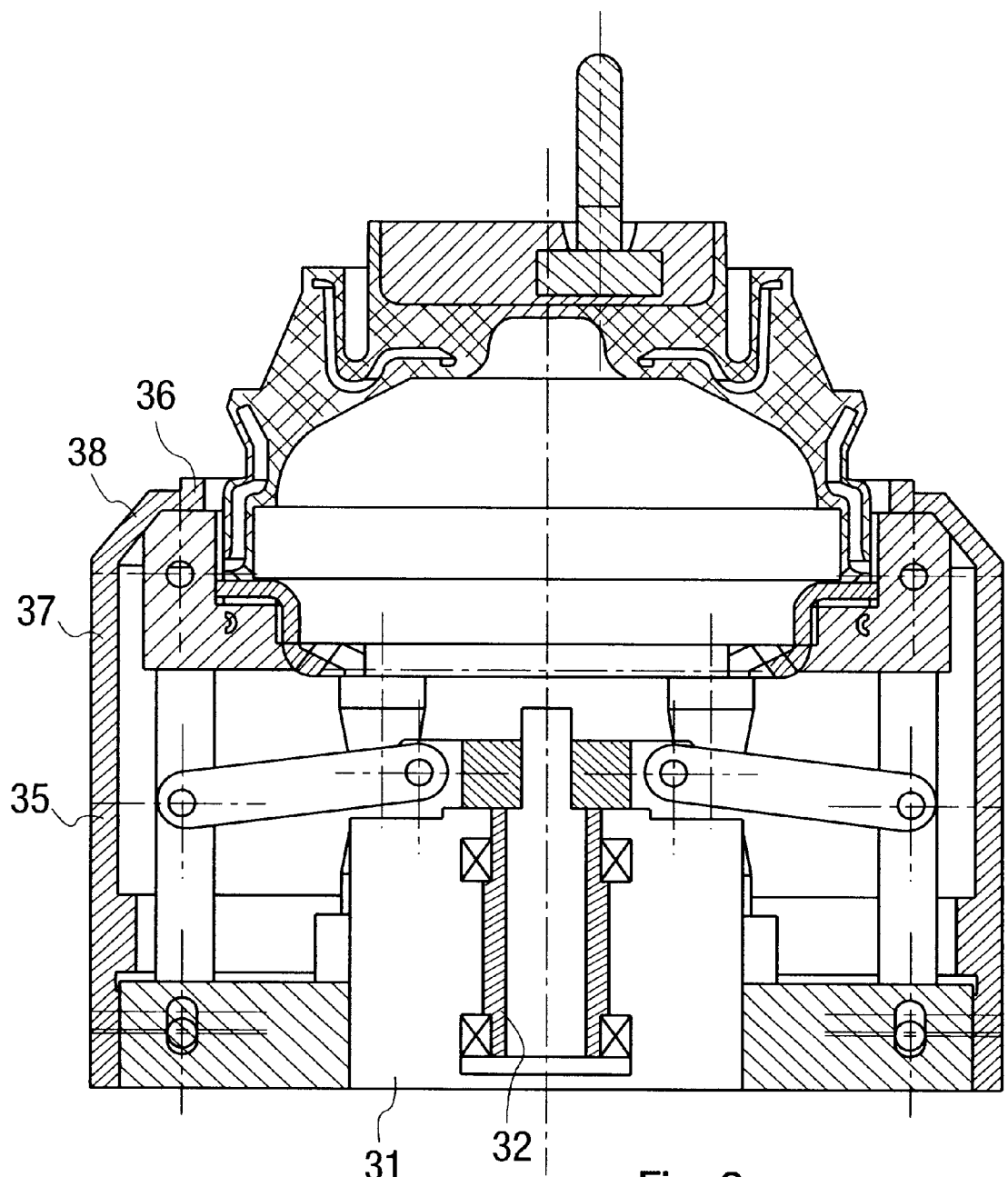
FIG. 2 is the engine bearing according to the present invention shown in FIG. 1 in the state of a spring element blocked by the switching device.

FIG. 2 shows that the tensioned state of the double toggle lever elements 20, 21 and 22 in the withdrawn state of the linear spindle is provided, whereas the double toggle lever elements are released in the extended state of the linear spindle 30 and spring action of the spring element 4 comprising the coil springs 12 is thus provided.

The intermediate plate 7, to which the free ends of the pressure levers 23 of the individual double toggle lever elements are fixed in an articulated manner, is displaced by the tensioning movement of the double toggle lever elements in the upward direction in the direction of the spring element 3, so that the lower coil springs are released to the extent that they have no spring action.

The entire lower area of the engine bearing, in which both the coil springs 12 and the double toggle lever elements 20, 21 and 22 are located, is surrounded in this exemplary embodiment by a pot-shaped housing 35, whose bottom is formed by the supporting element 2. At an upper end facing away from the supporting element 2, the housing 35 has an inwardly pointing beaded edge 36, and a wall area 38 beveled at an angle of approx. 45° on the inside of the housing is provided between the edge 36 and the vertical wall area 37 of the housing 35. This wall area 38 forms a conical bearing surface, on which a corresponding bearing surface 39 of the intermediate plate 7 is supported in the tensioned state of the double toggle lever elements 20, 21, 22. The axial gap between the edge 36 and the vertical edge of the hydraulic bearing determines the radial mobility in the released state.

Figure 3:
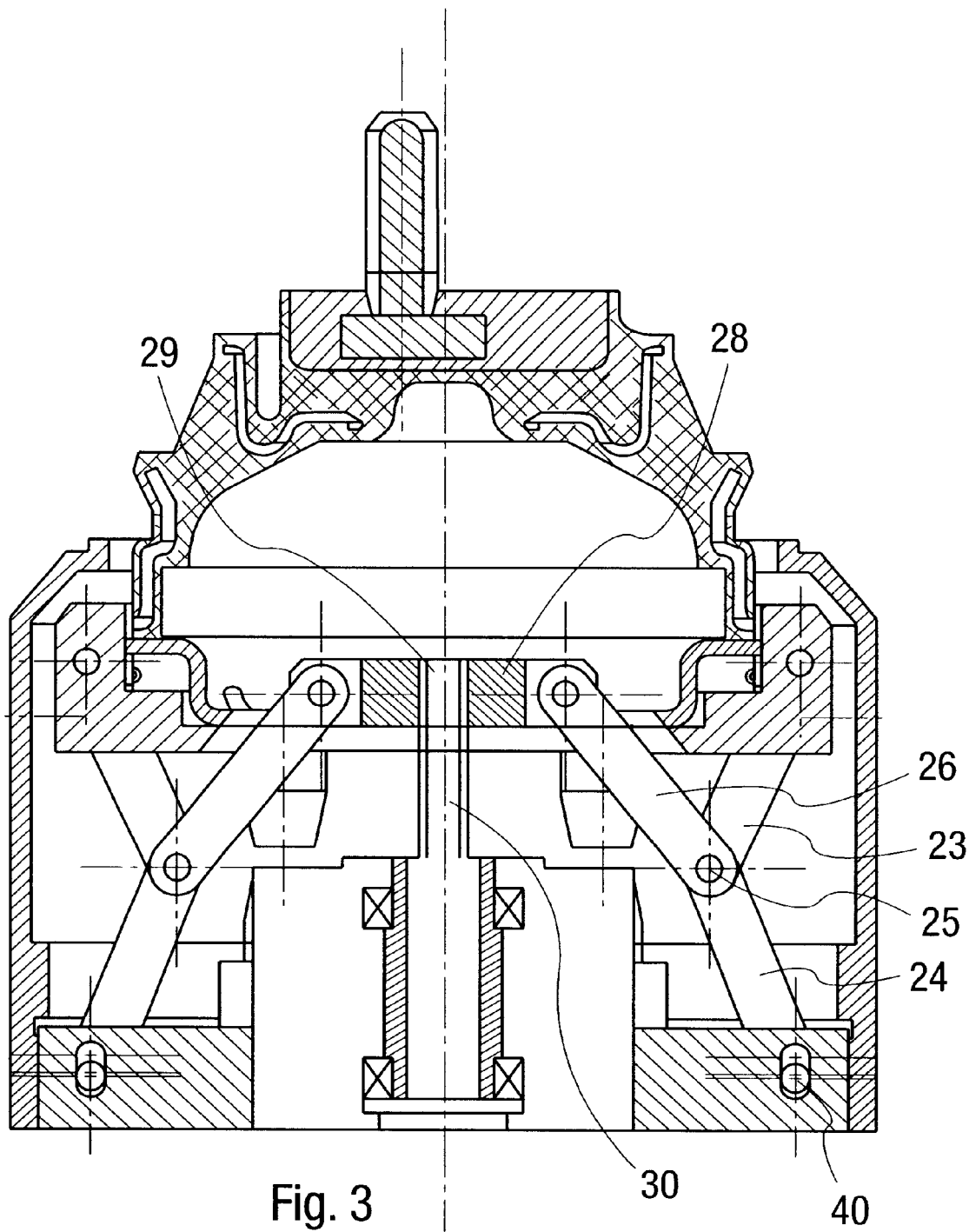
FIG. 3 is the engine bearing according to the present invention shown in FIG. 1 with the switching device of a spring element released.

In addition, FIGS. 2 and 3 also show that the lower end of the pressure lever 24, which faces the supporting element 2 and is fixed to same in an articulated manner, has an elongated hole 40, which makes possible an axial and radial mobility of the upper part of the engine bearing with the intermediate plate 7, the spring element 3 and the supporting bearing 1 in relation to the lower supporting element 2.

It is, of course, conceivable within the framework of additional embodiment variants to distribute the spring action of the spring element 4 over a different number of coil springs 12 or to replace these with springs of another design. Moreover, depending on the desired size, the tensioning forces between the supporting element 2 and the intermediate plate 7 may, of course, be distributed over a larger number of double toggle lever elements 20, 21 and 22 compared with the number of double toggle lever elements embodied in this exemplary embodiment.

While specific embodiments of the invention have been shown and described in detail to illustrate the application of the principles of the invention, it will be understood that the invention may be embodied otherwise without departing from such principles.

What is claimed is:

1. A spring rate-switchable engine bearing, comprising:
   a supporting bearing element;
   a supporting element;
   at least two spring elements arranged in parallel or in series between said supporting bearing element and said supporting element;
   a switching device for blocking one of said spring elements in a blocking state, said switching device including a double toggle mechanism.

2. A spring rate-switchable engine bearing in accordance with claim 1, wherein said double toggle mechanism has a plurality of double toggle lever elements arranged concentrically to a central axis of the engine bearing with two pressure levers each and with an adjusting lever each, which can be moved by a common actuating member, wherein said adjusting lever is connected at an outer end facing away from said actuating member to an end each of said two pressure levers in a pivot bearing, and outer free ends of said pressure levers facing away from said pivot bearing are connected each to a supporting element and to an intermediate plate, which is arranged between said first spring element and said second spring element.

3. A spring rate-switchable engine bearing in accordance with claim 1, wherein said blockable spring element comprises a plurality of coil springs arranged concentrically to a central axis of the engine bearing, said plurality of coil springs being directed in a longitudinal direction in parallel thereto and being located at spaced locations from one another.

4. A spring rate-switchable engine bearing in accordance with claim 3, wherein said coil springs and said double toggle lever elements are arranged alternatingly concentrically to said central axis of the engine bearing.

5. A spring rate-switchable engine bearing in accordance with claim 2, wherein said actuating member is displaceable by an electric motor operator with a linear spindle in a longitudinal direction of said central axis of the engine bearing.

6. A spring rate-switchable engine bearing in accordance with claim 1, further comprising a housing wherein said switching device and the said blockable spring element are surrounded by said housing, wherein said housing is supported in said blocked state of the said spring element on a conical bearing surface, which is part of an intermediate plate between the said first and second spring elements.

7. A spring rate-switchable engine bearing in accordance with claim 2, wherein a free end of said pressure lever facing said supporting element is mounted in an elongated hole, whose longitudinal axis extends in parallel to said longitudinal axis of the engine bearing.

8. An engine bearing, comprising:
   a supporting bearing element;
   a supporting element;
   at least two spring elements functionally connected between said supporting bearing element and said supporting element in parallel or in series, one of said springs being a blockable spring;
   a switching device for acting on said blockable spring to block said blockable spring elements in a blocking state of said switching device to provide a rate-switchable spring, said switching device including a double toggle mechanism.

9. An engine bearing in accordance with claim 8, wherein said double toggle mechanism includes:
   a plurality of double toggle lever elements arranged concentrically to a central axis of the engine bearing;
   two pressure levers associated with each of said double toggle levers;
   an adjusting lever associated with each of said double toggle levers;
   a common actuating member, said adjusting lever being movable by said common actuating member;
   a pivot bearing, wherein said adjusting lever is connected at an outer end facing away from said common actuating member to an end each of said two pressure levers in said pivot bearing;

a supporting element; and an intermediate plate arranged between said first spring element and said second spring element, outer free ends of said pressure levers facing away from said pivot bearing being connected each to said supporting element and to said intermediate plate.

10. An engine bearing in accordance with claim 8, wherein said blockable spring element comprises a plurality of coil springs arranged concentrically to a central axis of the engine bearing, said plurality of coil springs being directed in a longitudinal direction in parallel thereto and being located at spaced locations from one another.

11. An engine bearing in accordance with claim 10, wherein said coil springs and said double toggle lever elements are arranged alternatingly concentrically to said central axis of the engine bearing.

12. An engine bearing in accordance with claim 9, wherein said actuating member is displaceable by an electric motor operator with a linear spindle in a longitudinal direction of said central axis of the engine bearing.

13. An engine bearing in accordance with claim 8, further comprising a housing wherein said switching device and the said blockable spring element are surrounded by said housing, wherein said housing is supported in said blocked state of the said spring element on a conical bearing surface, which is part of an intermediate plate between the said first and second spring elements.

14. An engine bearing in accordance with claim 9, wherein a free end of said pressure lever facing said supporting element is mounted in an elongated hole, whose longitudinal axis extends in parallel to said longitudinal axis of the engine bearing.

* * * * *